US 6,663,290 B1

(12) United States Patent
Schepis

(10) Patent No.: US 6,663,290 B1
(45) Date of Patent: Dec. 16, 2003

(54) GROOVED BEARING BALL AND ROLLING ELEMENT

(76) Inventor: Anthony Schepis, 124 Olde Forge Rd., Hanover, MA (US) 02339

( * ) Notice: Subject to any disclaimer, the term of this patent is extended or adjusted under 35 U.S.C. 154(b) by 61 days.

(21) Appl. No.: 10/121,150

(22) Filed: Apr. 11, 2002

(51) Int. Cl.[7] .......................... F16C 33/66; F16C 33/32; F16C 33/36
(52) U.S. Cl. ...................... 384/491; 384/565; 384/462
(58) Field of Search .................. 384/49, 491, 492, 384/462, 610, 565

(56) References Cited

U.S. PATENT DOCUMENTS

| 938,251 | A | * | 10/1909 | Latham | 384/565 |
| 1,084,582 | A | * | 1/1914 | Lawson | 384/425 |
| 4,741,632 | A | * | 5/1988 | Jacobson | 384/491 |
| 5,498,086 | A | * | 3/1996 | Ou | 384/491 |
| 5,642,947 | A | * | 7/1997 | Akamatsu et al. | 384/491 |
| 5,967,672 | A | * | 10/1999 | Akamatsu et al. | 384/516 |
| 6,578,443 | B2 | * | 6/2003 | Cho | 74/473.36 |

* cited by examiner

Primary Examiner—Thomas R. Hannon
(74) Attorney, Agent, or Firm—John P. McGonagle

(57) ABSTRACT

A bearing with shallow grooves on the surface of the rolling element. In addition, pockets of lubricant are carried in its own internal structure via a network of through-holes crossing at its center which release lubricant to the grooves and surface of the rolling element upon the rotation of the bearing assembly.

17 Claims, 3 Drawing Sheets

GROOVED BEARING BALL AND ROLLING ELEMENT

BACKGROUND OF THE INVENTION

This invention relates to bearings, and in particular to a grooved bearing ball and rolling element providing more effective distribution of lubricant within a bearing assembly.

Bearing manufacturers are constantly struggling with ways to properly lubricate the bearing assemblies of their rotating machinery. Many systems have been designed depicting methods for the introduction of lubricants to the bearings and ways of dispersing the lubricants to the contact points within the bearings. However, to the best of applicant's knowledge, none of systems and methods in the prior art focus on the rolling element (ball or roller) as a carrier of its own lubricant.

One of the known problems with current bearing technology is that on occasion oil and/or grease is not evenly distributed across the width of the bearing assembly and contact surfaces. When not in use over an extended period of time, lubricating oil and grease will tend to settle to the lower end of the bearing assembly. Hence, when the shaft starts rotating at high speeds, the upper part of the bearing assembly is starved for lubrication and dry spots form on the contacting surfaces. This will eventually result in premature failure due to heat created by excessive friction and lack of proper lubrication.

SUMMARY OF THE INVENTION

In view of the foregoing, it is a primary objective of the present invention to provide a more positive flow of lubricant and movement of the lubricating medium within the bearing assembly, thereby prevent dry spots from developing while the assembly is in operation. This will enable the bearing to extend its life expectancy and performance.

The present invention meets this objective by focusing on a rolling element design that enhances the distribution of lubricant. The present invention provides shallow grooves on the external surface of the rolling element. In addition, pockets of lubricant are carried in the rolling element's own internal structure via a network of through-holes crossing at its center wherefrom lubricant is released upon the rotation of the bearing assembly.

The shallow grooves on the external surface of the bearing ball or rolling element, coupled with penetrating holes interconnecting the surface grooves, generate a more positive movement of the lubricant so as to prevent "dry" spots from occurring on the bearing surface and thereby extending the life of the bearing. Effectively, the grooves and interconnecting holes act as lubricant carriers and pocket reservoirs so that the bearing is not starved for lubrication. The design of the present invention creates an instantaneous supply of lubricant since the lubricant is already trapped in the grooves and internal holes of the invention bearing element. As a further benefit, the lubricant flowing through the center of the bearing will have a cooling effect by taking heat away from the rolling element.

The grooved surface of the rolling element also prevents the bearing element from "skidding", another problem faced by current technology. Skidding wears the rolling element surfaces unevenly thereby causing the bearing to fail prematurely.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
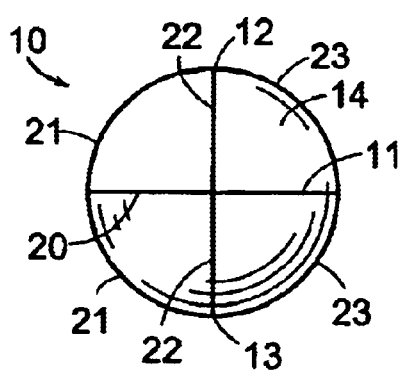
FIG. 1 is a front elevational view of the invention.
Figure 2:
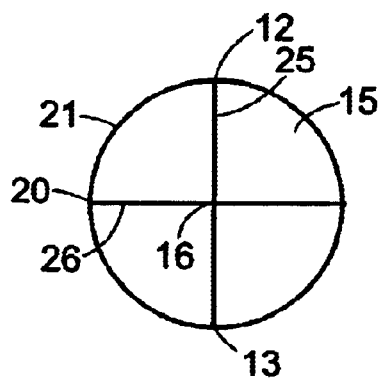
FIG. 2 is a cross sectional view of the invention of FIG. 1.
Figure 3:
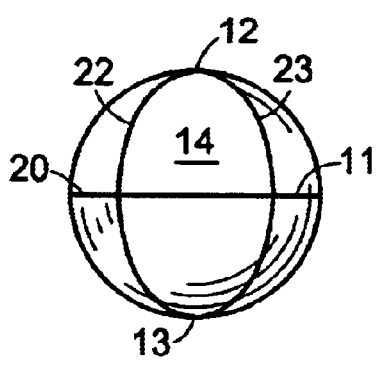
FIG. 3 is a front perspective view of the invention.
Figure 4:
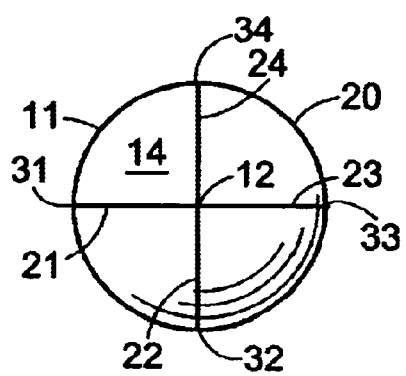
FIG. 4 is a top view of the invention.
Figure 5:
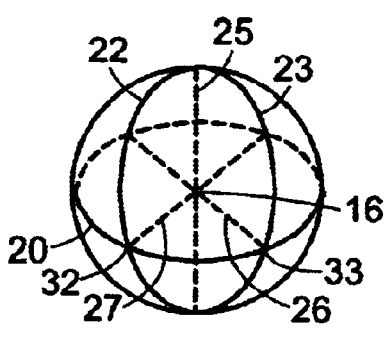
FIG. 5 is a view of FIG. 3, partly in section.
Figure 6:
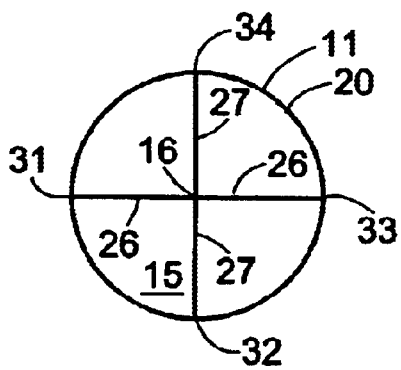
FIG. 6 is a cross sectional view of FIG. 4 along the plane of the equator.
Figure 7:
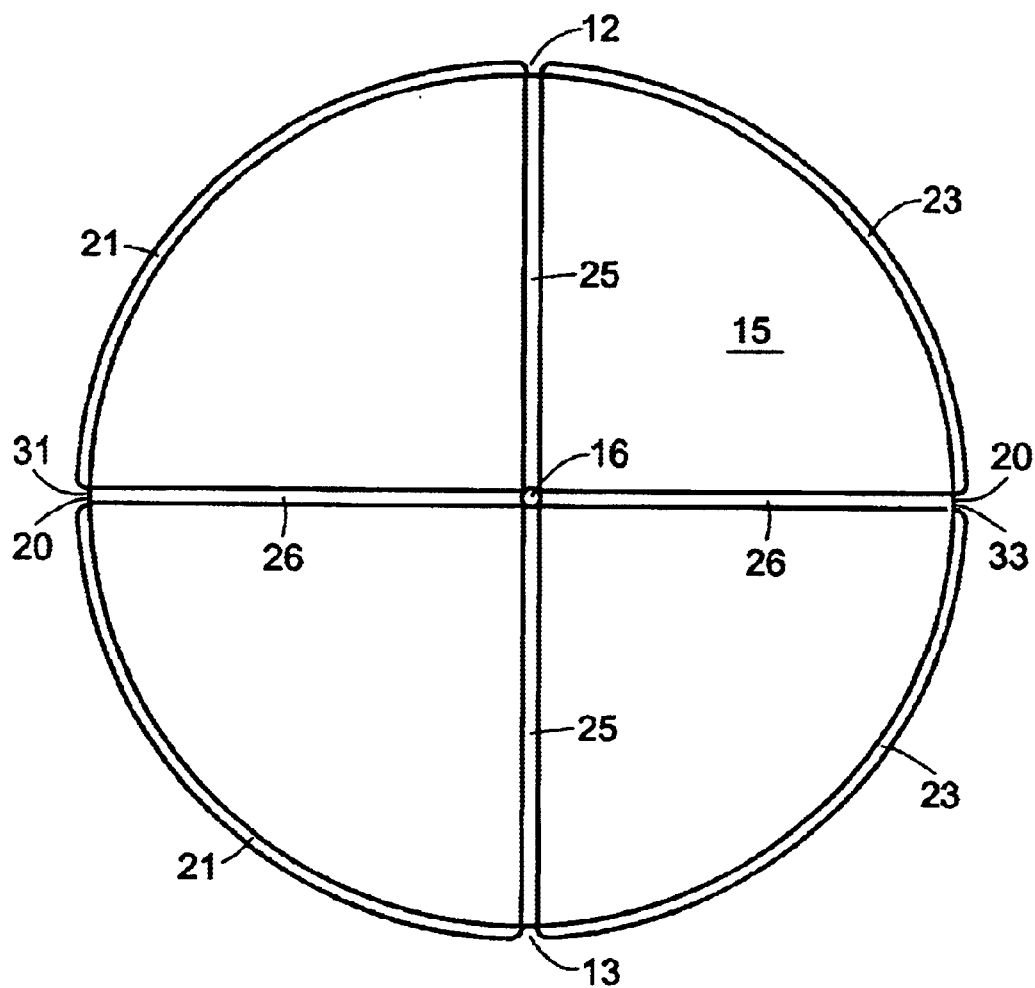
FIG. 7 is an expanded view of FIG. 2.
Figure 8:
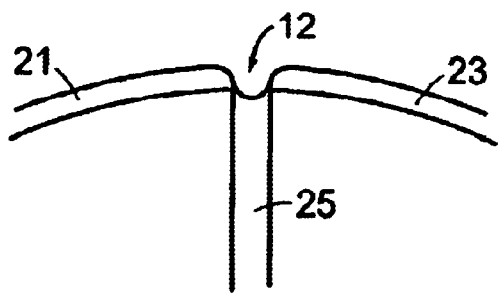
FIG. 8 is a detailed view, partly in section, of the north pole of FIG. 5.

Referring to the drawings in detail wherein like elements are indicated by like numerals, there is shown a solid, spherical, bearing rolling element in the form of a bearing ball 10 constructed according to the principles of the present invention. The bearing ball 10 has a circumferential equator 11, an external surface 14, a solid interior 15, and two poles on the external surface, one designated as the north pole 12 and the other designated as the south pole 13. This embodiment of the invention has a continuous shallow groove 20 formed about the ball's equator 11. The groove 20 has a semicircular cross section. Four additional shallow, north-pole to south-pole, grooves 21, 22, 23, 24 are formed along 0°, 90°, 180° and 270° latitudes of the bearing ball 10, each groove 21, 22, 23, 24 beginning at the north pole 12 and extending to the south pole 13. The combination of the 0° groove 21 and 180° groove 23 form a 360° groove beginning and ending at the north pole 12. The combination of the 90° groove 22 and 270° groove 24 also form a 360° groove beginning and ending at the north pole 12. Each latitudinal groove 21, 22, 23, 24 also has a semicircular cross section. Each of the latitudinal grooves 21, 22, 23, 24 intersect and join the equator groove 20 at each latitudinal groove midpoint 31, 32, 33, 34, respectively.

A generally straight, elongated aperture 25 having a circular cross section is formed along an axis formed by the poles 12, 13, extending through the center 16 of the ball bearing interior 15 from the north pole 12 to the south pole 13. The latitudinal grooves 21, 22, 23, 24 and axial aperture 25 intersect and join at the two poles 12, 13. Another generally straight, elongated aperture 26 having a circular cross section is formed along an axis formed by the intersection of the equator groove 20 and the midpoint 31 of the 0° latitudinal groove 21, extending through the center 16 of the bearing ball interior 15 to the intersection of the equator groove 20 and the midpoint 33 of the 180° latitudinal groove 23. Still another generally straight, elongated aperture 27 having a circular cross section is formed along an axis formed by the intersection of the equator groove 20 and the midpoint 32 of the 90° latitudinal groove 22, extending through the center 16 of the bearing ball interior 15 to the intersection of the equator groove 20 and the midpoint 34 of the 270° latitudinal groove 24. The latitudinal grooves 21, 22, 23, 24 and north-south axial aperture 25 intersect and join at the two poles 12, 13. The apertures 25, 26, 27 intersect and join at the bearing ball interior center 16.

A bearing assembly containing an invention rolling element 10 would be lubricated in a normal manner. As the rolling element 10 rotates it draws lubrication into its grooves 20, 21, 22, 23, 24 and apertures 25, 26, 27 during operation. The rolling element grooves 20–24 and apertures 25–27 will thereby entrap lubricant as the rolling element 10 rotates distributing the lubricant evenly and storing some for application to "dry" spots which may form during operation or during a halt in operation. Lubricant will wind up in all of the bearing ball's grooves 20, 21, 22, 23, 24 and apertures 25, 26, 27 since all interconnect. The lubricating medium will thereby be distributed throughout the bearing ball surface 14. The axial apertures 25, 26, 27 act primarily as lubricating reservoirs within the bearing ball interior 15 and may move lubrication out to the grooves 20, 21, 22, 23, 24 through either the poles 12, 13 or the equator 11 as needed. The function of the grooves 20, 21, 22, 23, 24 is primarily to distribute the lubrication over the bearing ball surface 14. The groove 20, 21, 22, 23, 24 semicircular cross sections are rounded at their edges with the surface 14 for a smooth flow of lubricant from groove to surface and back. Notwithstanding the primary functions of the apertures 25, 26, 27 and grooves 20, 21, 22, 23, 24, all may also secondarily do the function of the other. The movement of lubricant through grooves 20, 21, 22, 23, 24 and apertures 25, 26, 27 also has a cooling effect whereby the moving lubricant draws and disperses heat from the rolling element, especially from the rolling element interior 15.

Figure 9:
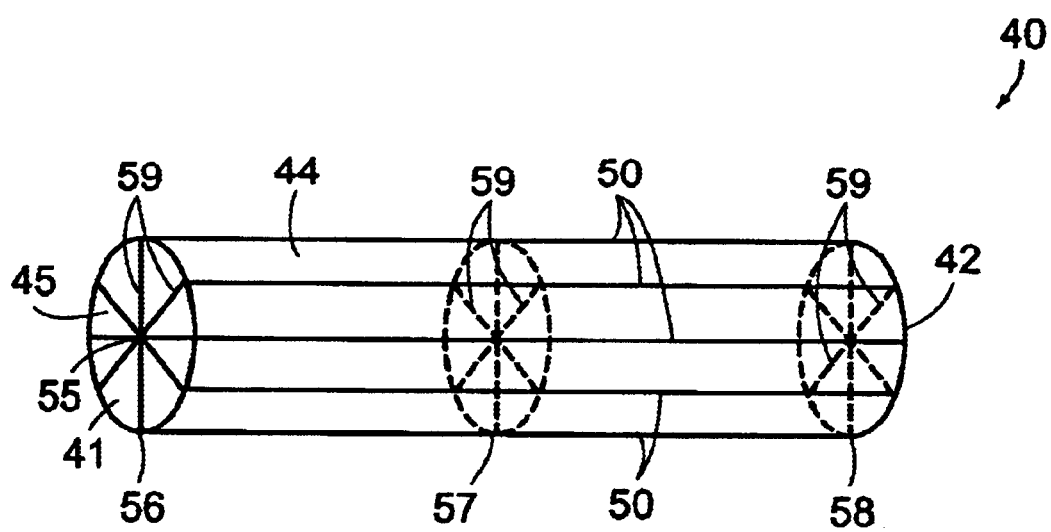
FIG. 9 is a front elevational view of another embodiment of the invention.

Some roller bearings have a cylindrical shape. Referring more particularly to FIG. 9, there is shown a solid, cylindrical bearing rolling element constructed according to the principles of the present invention. The principles of the present invention described above apply equally well to this type of bearing. The cylindrical bearing 40 shown has a first side 41 from which a cylindrical side wall 42 extends horizontally to a second side 43, opposite and parallel to said first side 41, said sides defining a longitudinal axis of said cylindrical bearing 40, said longitudinal axis being generally perpendicular to the bearing sides 41, 43. The cylindrical bearing 40 has an external surface 44 and a solid interior 45. This embodiment of the invention has eight, equally spaced, parallel, longitudinal, shallow grooves 50 formed in the bearing external surface 44, each said groove extending from the first side wall 42 to the second side wall 43, each said longitudinal groove 50 being parallel to the longitudinal axis of the cylindrical bearing 40. Other embodiments of the invention may have more or less longitudinal grooves. Each groove 50 has a semicircular cross section.

A generally straight, elongated aperture 55 having a circular cross section is formed through the cylindrical bearing center along a central, longitudinal axis of the cylindrical bearing 40. In this embodiment of the invention, three sets 56, 57, 58 of eight apertures 59 interconnect each longitudinal surface groove 50 with the central, elongated aperture 55, one set 56 at the first side 41, one set 57 at an approximate longitudinal midpoint, and one set 58 at the second side 43. Each aperture 59 in each set has a circular cross section.

It is understood that the above-described embodiments are merely illustrative of the application. Other embodiments may be readily devised by those skilled in the art which will embody the principles of the invention and fall within the spirit and scope thereof. For example, grooves and apertures may be added or subtracted to or from the embodiment shown.

I claim:

1. A bearing rolling element, comprising:
    a solid, spherical bearing ball having a circumferential equator, an external surface, a solid interior, an interior center, and two poles on the external surface, one designated as the north pole and the other designated as the south pole, said bearing ball having a plurality of interconnecting shallow grooves formed on the bearing ball external surface, said bearing ball having a plurality of generally straight, elongated apertures having a circular cross section formed along a bearing ball radial axis through said interior center, each said aperture having two ends, each said end opening into at least one of said grooves.

2. A bearing rolling element as recited in claim 1, wherein:
    each said groove has a semicircular cross section rounded at an edge with the bearing ball external surface.

3. A bearing rolling element as recited in claim 2, wherein:
    one of said grooves is formed about the ball's equator.

4. A bearing rolling element as recited in claim 3, wherein:
    a plurality of said grooves extend from the bearing ball north pole to the bearing ball south pole, said plurality of grooves intersecting said equator groove.

5. A bearing rolling element as recited in claim 4, wherein:
    one of said apertures is formed along an axis formed by the north and south poles extending through the ball bearing interior center.

6. A bearing rolling element as recited in claim 5, wherein:
    one of said apertures is formed along an axis extending through the ball bearing interior center in a plane defined by the equator, said aperture opening at both ends into the equator groove.

7. A bearing rolling element as recited in claim 6, wherein:
    another of said apertures is formed along an axis extending through the ball bearing interior center in a plane defined by the equator, said aperture opening at both ends into the equator groove.

8. A bearing rolling element as recited in claim 7, wherein:
    said plurality of grooves extending from the bearing ball north pole to the bearing ball south pole is comprised of four grooves formed along 0°, 90°, 180° and 270° latitudes of the bearing ball, each groove beginning at the north pole and extending to the south pole, said 0° latitude groove and 180° latitude groove combining to form a 360° groove beginning and ending at the north pole, said 90° latitude groove and 270° latitude groove combining to form a 360° groove beginning and ending at the north pole, each said latitudinal groove intersecting and joining said equator groove at a latitudinal groove midpoint.

9. A bearing rolling element as recited in claim 8, wherein:
    said latitudinal grooves and said north and south pole aperture intersect and join at said north and south poles.

10. A bearing rolling element as recited in claim 9, wherein:
    said latitudinal grooves and said north and south pole aperture intersect and join at said north and south poles.

11. A bearing rolling element as recited in claim 10, wherein:
    the axis of one of said apertures extending through the ball bearing interior center in a plane defined by the equator, is defined by the intersection of the equator groove and a midpoint of the 0° latitudinal groove, extending through the bearing ball interior to the intersection of the equator groove and a midpoint of the 180° latitudinal groove.

12. A bearing rolling element as recited in claim 11, wherein:

the axis of another of said apertures extending through the ball bearing interior center in a plane defined by the equator, is defined by the intersection of the equator groove and a midpoint of the 90° latitudinal groove, extending through the bearing ball interior to the intersection of the equator groove and a midpoint of the 270° latitudinal groove.

13. A bearing rolling element as recited in claim 12, wherein:

said apertures intersect and join at the bearing ball interior center.

14. A bearing rolling element, comprising:

a solid, cylindrical bearing rolling element having a first side from which a cylindrical side wall extends horizontally to a second side, opposite and parallel to said first side, said sides defining a longitudinal axis of said cylindrical bearing, said longitudinal axis being generally perpendicular to the bearing sides, said cylindrical bearing having an external surface, a solid interior, a plurality of equally spaced, parallel, longitudinal, shallow grooves formed in said external surface, each said groove extending from the first side wall to the second side wall, each said longitudinal groove being parallel to the longitudinal axis of the cylindrical bearing, said cylindrical bearing having a generally straight, elongated aperture formed through the cylindrical bearing center along a central, longitudinal axis of the cylindrical bearing, said cylindrical bearing having a plurality of sets of a plurality of apertures interconnecting each longitudinal surface groove with the central, elongated aperture, said sets of apertures being equally spaced along the longitudinal axis of said cylindrical bearing.

15. A bearing rolling element as recited in claim 14, wherein:

each groove has a semicircular cross section.

16. A bearing rolling element as recited in claim 15, wherein:

the elongated central aperture has a circular cross section.

17. A bearing rolling element as recited in claim 16, wherein:

each aperture in each set has a circular cross section.

\* \* \* \* \*